US011815589B2

(12) United States Patent
Jansen et al.

(10) Patent No.: US 11,815,589 B2
(45) Date of Patent: Nov. 14, 2023

(54) MULTIPLE-MODE RADAR WITH RESOLUTION OF SPATIAL AMBIGUITY

(71) Applicant: NXP B.V., Eindhoven (NL)

(72) Inventors: Feike Guus Jansen, Eindhoven (NL); Francesco Laghezza, Eindhoven (NL); Saif Alhasson, Munich (DE)

(73) Assignee: NXP B.V., Eindhoven (NL)

( * ) Notice: Subject to any disclaimer, the term of this patent is extended or adjusted under 35 U.S.C. 154(b) by 269 days.

(21) Appl. No.: 17/006,503

(22) Filed: Aug. 28, 2020

(65) Prior Publication Data

US 2022/0066012 A1    Mar. 3, 2022

(51) Int. Cl.
*G01S 13/34* (2006.01)
*G01S 13/931* (2020.01)
(Continued)

(52) U.S. Cl.
CPC ............ *G01S 13/34* (2013.01); *G01S 13/931* (2013.01); *H04B 1/0064* (2013.01); *H04B 1/18* (2013.01);
(Continued)

(58) Field of Classification Search
CPC .................. G01S 13/34; G01S 13/931; G01S 2013/93271; G01S 2013/93275; G01S 13/584; G01S 13/4418; G01S 13/4454; G01S 7/415; G01S 7/0234; G01S 7/0235; G01S 7/03; G01S 7/356; G01S 13/343; G01S 13/4445; G01S 7/0232; G01S 7/35;
(Continued)

(56) References Cited

U.S. PATENT DOCUMENTS

2011/0074621 A1    3/2011    Wintermantel
2015/0084806 A1    3/2015    Rohling
(Continued)

FOREIGN PATENT DOCUMENTS

EP    3435113 A1    1/2019

OTHER PUBLICATIONS

A Fully-Integrated 77-GHz FMCW Radar Transceiver in 65-nm CMOS Technology Jri Lee (Year: 2010).*
(Continued)

*Primary Examiner* — Peter M Bythrow
*Assistant Examiner* — Nazra Nur Waheed (57) ABSTRACT

In imaging radar, examples are directed to uses of multiple sets of transmit antenna included with transceiver circuitry, for transmitting in a plurality of modes. Transmissions may involve having at least one transmit antenna, from each of at least two of the multiple sets, to transmit continuous-wave energy concurrently (simultaneously) in one or more of the plurality of different modes. Transceiver circuitry may include multiple receive antennas which may be receiving reflections of the continuous-wave energy from various targets. Signals from the multiple receive antennas may route to signal processing circuitry. The signal processing circuitry may respond to the received reflections of the continuous-wave energy by assessing differences in antenna gain and/or phase due to transmit antenna position associated with the received reflections. This signal processing assessment may mitigate or resolve at least one spatial ambiguity in at least one direction of arrival dimension associated with the received reflections.

20 Claims, 6 Drawing Sheets

(51) Int. Cl.
  *H04B 1/00* (2006.01)
  *H04B 1/18* (2006.01)
  *H04B 1/38* (2015.01)

(52) U.S. Cl.
  CPC ...... *H04B 1/38* (2013.01); *G01S 2013/93271* (2020.01); *G01S 2013/93275* (2020.01)

(58) Field of Classification Search
  CPC ......... G01S 7/352; G01S 7/41; H04B 1/0064; H04B 1/18; H04B 1/38
  See application file for complete search history.

(56) References Cited

U.S. PATENT DOCUMENTS

| | | |
|---|---|---|
| 2016/0124086 A1 | 5/2016 | Jansen et al. |
| 2017/0168139 A1 | 6/2017 | Lim et al. |
| 2018/0172813 A1 | 6/2018 | Rao et al. |
| 2018/0203105 A1 | 7/2018 | Kuehnle et al. |
| 2019/0310358 A1* | 10/2019 | Lee .................. G01S 13/42 |
| 2019/0391230 A1 | 12/2019 | Loesch et al. |
| 2020/0049812 A1 | 2/2020 | Jansen |

OTHER PUBLICATIONS

Automotive Radar Doppler Division MIMO With Velocity Ambiguity Resolving Capabilities F.G. Jansen (Year: 2019).*

J. Lee, Y.-A. Li, M.-H. Hung and S.-J. Huang, "A Fully-Integrated 77-GHz FMCW Radar Transceiver in 65-nm CMOS Technology," in IEEE Journal of Solid-State Circuits, vol. 45, No. 12, pp. 2746-2756, Dec. 2010, doi: 10.1109/JSSC.2010.2075250 (Year: 2010).*

F. G. Jansen, "Automotive Radar Doppler Division MIMO With Velocity Ambiguity Resolving Capabilities," 2019 16th European Radar Conference (EuRAD), Paris, France, 2019, pp. 245-248. (Year: 2019).*

U.S. Appl. No. 16/790,319, filed Feb. 13, 2020, entitled: Radar Apparatuses and Methods Involving Determination of Velocity of an Object. The Examiner is referred to the copending patent prosecution of the common Applicant (no attachment).

* cited by examiner

MULTIPLE-MODE RADAR WITH RESOLUTION OF SPATIAL AMBIGUITY

OVERVIEW

Aspects of various embodiments are directed to imaging radar having multiple modes to resolve spatial ambiguities associated with received reflections.

In vehicles, forward-looking automotive radar oftentimes serves multiple applications such as automatic cruise control, automatic emergency braking and front-cross traffic alerts. The area covered by the forward-looking view, often defined relative to a viewing angle, may be referred to as a field of view (or FOV). In front of a car, for example, the FOV for a front-mount sensor corresponds to pre-defined limited area extending out an angle defined by the sensor. It is within this limited area that objects in front of a car, within a range accuracy that diminishes with distance, would be detected. The FOV may be characterized via metrics in terms of an azimuth (lateral-distance) coverage, elevation (vertical-distance) coverage, as well as radial distance coverage.

In radar detection especially for objects in front of a car, optimizing detection reliability has been an ongoing challenge. For certain radar detection systems, such optimization involves minimizing measurement ambiguities with regards to resolving where a particular object might be relative to the FOV of a sensor, or the respective FOVs of multiple sensors being used to identify an apparent object. With efforts to use electric (e.g., battery-operated) cars, these optimization efforts may also involve ongoing efforts to minimize both power consumption and associated costs.

These and other matters have presented challenges to radar system implementations, for a variety of applications.

SUMMARY

Various example embodiments are directed to issues such as those addressed above and/or others which may become apparent from the following disclosure concerning detection of objects via radar to resolve spatial ambiguity issues such as in the angle of arrival domain.

Certain specific aspects of the present disclosure are directed to resolving such spatial ambiguity by using multiple sets of differently-arranged transmit and receive antennas in conjunction with a multi-mode radar signal to assess differences in antenna gain associated with different antenna arrangements In other related examples, resolving such spatial ambiguity is by using such antennas arrangements and in processing the reflected signals: the differences in phase of due to transmit antenna positions provided by the antenna arrangements are assessed; and/or the differences in such phase and the differences of antenna gain are assessed.

According to one example, the present disclosure concerns an approach and system having transceiver circuitry that include multiple sets of transmit antennas and includes multiple receive antennas to receive reflections of continuous-wave energy. The multiple sets of transmit antennas may correspond respectively to a plurality of different modes, and typically at least two transmit antenna from each of at least two of the sets are used to transmit the signal (e.g., continuous-wave energy). For example, one specific mode may use at least two of the sets to transmit the signal. Signal processing circuitry responds to the received reflections of the continuous-wave energy, and assesses differences in antenna gain and/or phase due to transmit antenna position associated with the received reflections and, in response, mitigates or resolves at least one spatial ambiguity such as in terms of the direction of arrival dimension associated with the received reflections.

As used in one specific type of radar transceiver system also according to the present disclosure, a method involves the radar signal being transmitted in one of a plurality of modes (e.g., wave shapes that repeatedly Interleave in time accordingly to specific patterns) via at least two transmit antenna from at least one of the multiple antenna sets (associated with a first field of view) and at least two transmit antennas from another of the multiple antenna sets (associated with a second field of view). Transceiver circuitry (the receive antennas and front-end circuitry) receives and processes reflections of the continuous-wave energy from the various targets reflecting the radar signal. Signal processing circuitry responds to the received reflections of the continuous-wave energy by assessing differences in antenna gain and/or phase due to antenna position associated with the received reflections (in certain specific examples, the positions of the antenna are allocated by the phase center of that antenna). This signal processing assessment may mitigate or resolve at least one spatial ambiguity in at least one direction of arrival dimension associated with the received reflections.

Other specific example embodiments are directed to methods involving multiple sets of transmit antennas including a first set of antennas for one wider field of view which is wider than at least one other of the fields of view. For example, using at least two antennas (e.g., two or three antennas) associated with one antenna set associated with a first field of view and using at least one antenna associated with another antenna set associated with a different field of view than the first is used, in connection with the different waveforms sent via each of these antennas, to facilitates the spatial ambiguity or ambiguities in detecting the position of the target objects. In another example, in certain example embodiments at a least one antenna is each set is used in each set (via one transmitter and using at least two receive antennas)) and as many as a dozen, two dozen or three dozen antennas in each set as may be selected for a given design.

In another specific example embodiment, the signal processing circuitry discussed previously may respond to the received reflections by using each of at least two of the multiple receive antennas to assess the differences in antenna gain and antenna position.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar detection for realizing increased resolution of spatial ambiguities at least in terms of the angle of arrival domain. Certain aspects of the present disclosure have been shown to be beneficial when used in the context of automotive applications such as for automatic cruise control (ACC), front cross traffic alert (FCTA), automatic emergency breaking (AEB), etc. In some embodiments, imaging radar uses multiple distinct field of views to fulfill the requirements associated with different forward-looking automotive applications. While examples discussed herein may be described using such aspects and applications for discussion purposes, it will be appreciated that other aspects and embodiments associated with the present disclosure are not necessarily so limited.

In the following description, various specific details are set forth to describe specific examples for a better understanding of the present disclosure. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to certain specific examples of the present disclosure, embodiments involve multiple sets of transmit antenna included with transceiver circuitry. Such a transmitter system may be capable of transmitting in a plurality of modes. Transmissions may involve having at least one transmit antenna, from each of at least two of the multiple sets, to transmit continuous-wave energy concurrently in one of the plurality of different modes. Transceiver circuitry may include multiple receive antennas which may receive reflections of the continuous-wave energy from various targets. Signals from the multiple receive antennas may route to signal processing circuitry. The signal processing circuitry may respond to the received reflections of the continuous-wave energy by assessing differences in antenna gain and in some examples, and also differences in phase due to antenna position. This signal processing assessment may be used to mitigate or resolve at least one spatial ambiguity in at least one direction of arrival dimension associated with the received reflections.

According to certain aspects, each of the multiple sets of transmit antenna may be associated with at least one of multiple fields of view (or FOV). The FOVs may be realized by dividing an overall set of the transmission antennas in multiple subsets and optimizing the radiation pattern for each subset with each subset including at least two antennas and typically not more than about a dozen antennas (hereinafter, each of these subsets may be referred to as a different set). Such an approach uses different optimized antenna patterns as received with relatively-high gain and processing according to aspects of the present disclosure, to facilitate the use of fewer antenna/transmission circuits as would otherwise be required to detect objects reliably at a similar distance; in this manner, a maximum distance is realized in connection with such FOVs. Moreover, by using fewer antenna/transmission circuits, such an approach may be implemented with so as to result in lower power consumption, fewer overall components, smaller housings and circuit boards for the circuit-based transceiver, and lower overall system costs.

In another more specific example, such signal processing circuitry as discussed above may respond to the received reflections by using each of at least two of the multiple receive antennas to assess the differences in antenna gain and phase due to antenna position. Consider, for example, the example method involving a first set of the multiple sets of antennas arranged with an increased spacing, relative to different spacing of antennas among another of the multiple sets of antennas, to provide a different field of view in terms of angle and/or range parameters. The different spacings are used to facilitate signal-processing, according to another aspect of the present disclosure, for resolving the spatial ambiguity in connection with the angle and/or range. For example, for resolution in terms of angle of detection, the different spacings assist in differentiating the direction of arrival of the reflected radar signals via a virtual array of the antennas respectively corresponding to the different fields of view.

As may be appreciated, the above-described specific examples may be used in automotive applications via radar-signal transceiver circuitry having front-end circuitry which sends chirp sequences via the transmit antennas and receives responsive chirps via the receive antennas, and having logic and/or computer processing circuitry to prepare the signal to be transmitted and interpret the reflections. Each chirp sequence is a linearly increasing frequency signal (e.g., from 75 and 76 GHz). In response, the reflections are chirps indicative of reflections from the output chirps, as is common in frequency modulated continuous wave (FMCW) radar systems. The processing circuitry may include an analog-to-digital converter (ADC) and a timing circuit to mix the output chirps with the responsive chirps (e.g., the reflections) and to generate a digital stream of input data from the mixture. The sequence of chirps (aka a frequency ramp signal) are transmitted, hit an object, and comes back to the transceiver circuitry with a given delay which represents the time-of-flight useful for detecting objects and, optionally, estimating their distance. After mixing of the received signal with the transmitted signal, the delay results in a sinusoidal wave signal with a beat frequency (or beat signal) which may be further processed via an ADC with assistance of a range FFT to process peaks in such signals to indicate if targets are present at different distances (e.g., ranges). In certain applications, targets that are below the noise floor at this stage and a second FFT is needed to provide sufficient processing gain (hence, this state is not 100% correct). By storing a number of range FFTs and transposing this stored data, velocity FFTs may be computed and, similarly, the results of the velocity FFTs are stored. The resulting data matrix is called the range Doppler map because it contains range and Doppler information about the targets. The range Doppler map is processed and the peaks are identified as targets and a target list is generated as outputs of the transceiver. Such processing circuitry may be used to derive the Doppler-spectrum data sets, including Doppler information and/or a target map based on the Doppler information and other aggregated or interpreted summary of the digital data stream (e.g., raw radar data) from the responsive chirp reflections. The target map may be generated using two or three dimensional fast Fourier transformation (2D- or 3D-FFT), as of the processing circuitry to show the position and velocity of each object (sometimes "a target"). As FMCW-type radar systems often have at least two FFTs for respective estimations of range, velocity, and/or angle of arrival of the reflections, the third FFT (arrival angle) may have a size corresponding to the number of virtual antennas (referring to at least one physical antenna configured to act as multiple antennas in this radar context). For further information regarding such processing and circuitry, reference may be made to U.S. patent application Ser. No. 16/790,319, filed Feb. 13, 2020 (assigned to the instant assignee) and incorporated by reference in its entirety and for the related radar processing methodology/circuitry.

Figure 1:
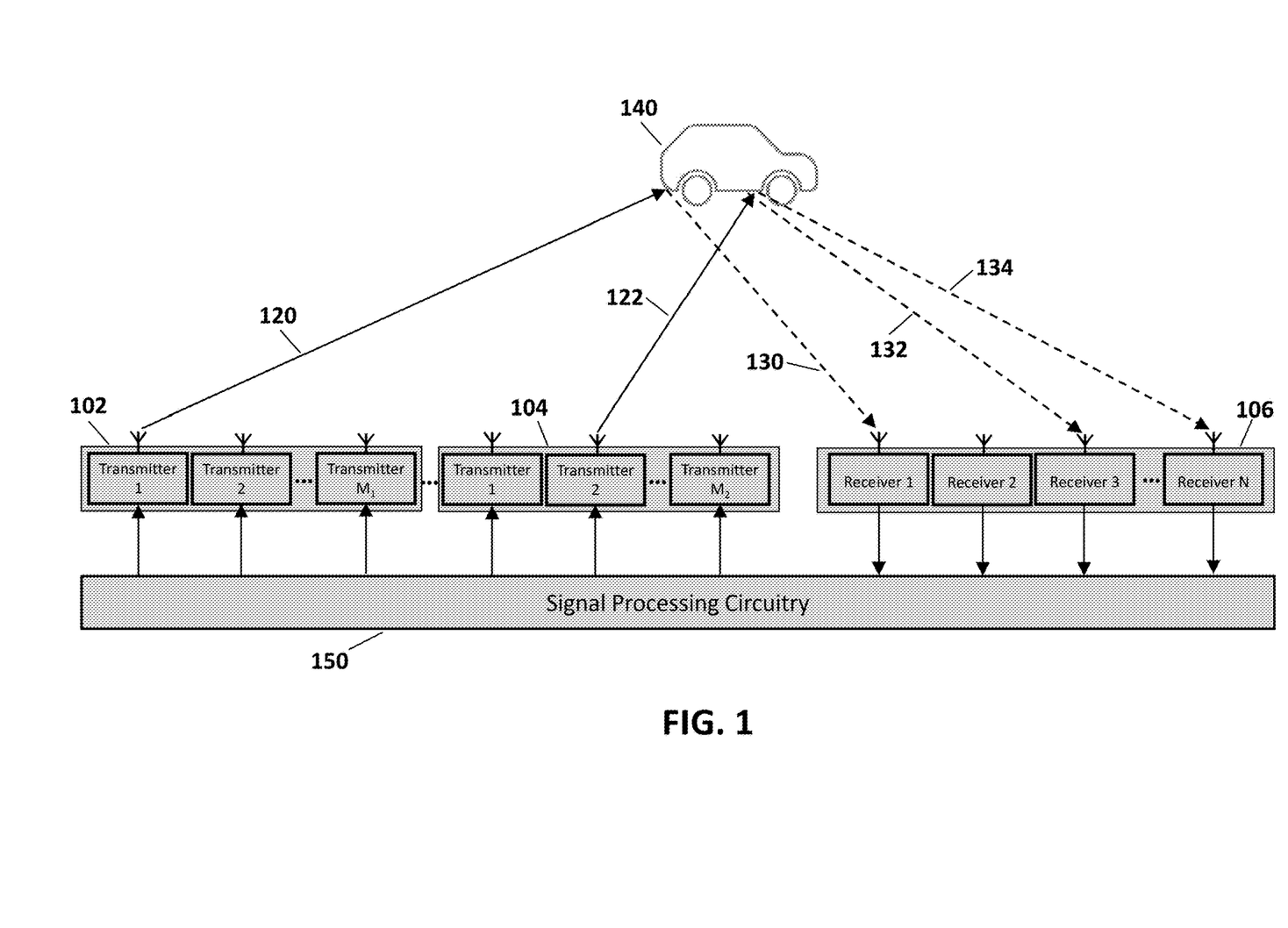
FIG. 1 is a system-level diagram illustrating an example of multiple transceivers used to send and detect reflected signals, in accordance with the present disclosure.

Turning now to the drawings, FIG. 1 is a system-level diagram illustrating a specific example of a transceiver, as may be used in an automobile or roadside station, to send and detect reflected signals. In one example, the transceiver includes at least two sets of transmitters such as the transmitter sets 102 and 104 and also includes a set of multiple receivers 106. In an automotive context, such systems as in FIG. 1 may include, for example, two or four sets of multiple transmitters, while three may be optimal in terms of costs and spatial resolution with each such transmitter set being associated with a different FOV and associated operation mode. As in the illustrated example of FIG. 1, each such transmitter set 102 and 104 includes front-end radio frequency (RF) circuitry and a related set of antennas for transmitting continuous-wave (CW) energy 120 and 122, as a signal concurrently sent from antennas of at least two of the transmitter sets 102 and 104. The CW-energy transmissions may reflect off a target such as automobile 140 to result in reflected signals 130, 132, and 134. The reflected signals may then be received by circuitry 106, also part of the transceiver one or more of a plurality of receivers and antennas. Signal processing circuitry 150 may then assess differences in antenna gain and antenna position associated with the received reflections 130, 132, and 134 to mitigate or resolve at least one spatial ambiguity such as one or more directions of arrival dimensions.

Figure 2:
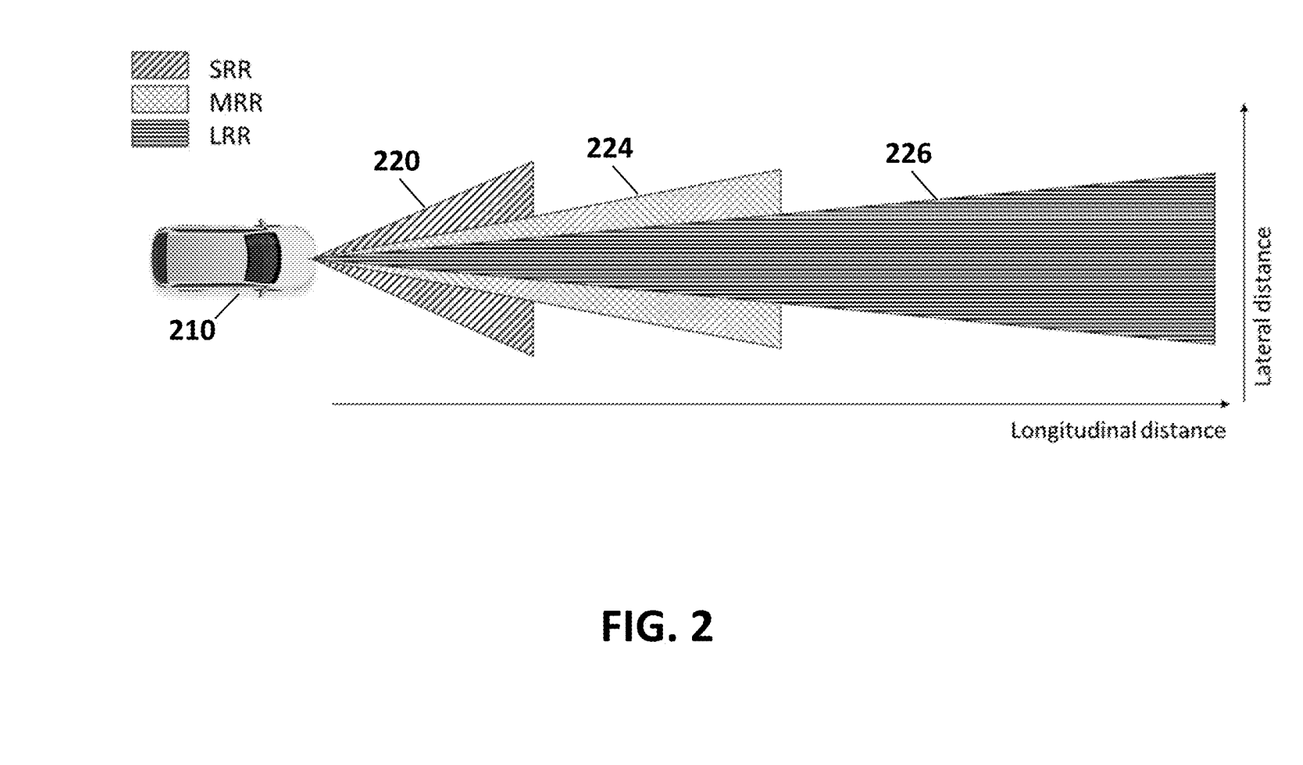
FIG. 2 is a graph illustrating example fields of view associated with three different radar transmitting antennas (or sets or antennas), in accordance with the present disclosure.

FIG. 2 illustrates an automobile 210 including a transceiver with circuitry for three FOVs respectively associated with: a short-range radar (SRR 220), a medium-range radar (MRR 224), and a long-range radar (LRR 226). Such a configuration of FOVs may be useful in connection with forward looking automotive radar designs and applications such as Automatic Cruise Control, Automatic Emergency Braking and Front-Cross Traffic Alert. For each such application, there may be a FOV associated with a pre-defined area in front of the car in which objects should be detected. As some applications may require, each FOV may provide azimuth (lateral distance) and elevation (vertical distance) coverage for object detection as well as a maximum longitudinal distance and/or a maximum lateral distance. In FIG. 2, the longitudinal and lateral distances are respectively shown on X and Y axes. The maximum distance may be determined, for example, by the maximum measurement range of the sensor and the signal to noise ratio (SNR) of the received signal. The SNR may also depend on the gain of the antenna. According to one aspect of the present disclosure, one exemplary way of realizing the different FOV's is to use antennas with different directivities for the different modes, and each such FOV may be also determined by the antenna gain (transmit and receive). The measurement range of the sensor depends on the waveform mode (or configuration) and sampling frequency of the radar transceiver, where such gain is primarily associated with that specific mode. Using multiple waveform modes may enable the radar to see with an overall field of view with an enhanced high-distance resolution, for example, up to 75 meters while lower-distance resolution may enable, for example, measurement of up to 300 meters.

In other related example, the multiple sets of transmit antennas included with transceiver circuitry are respectively associated with the plurality of different modes and with a plurality of different fields of view. Each of the fields of view has an associated range. From each antenna in the multiple sets, continuous-wave energy transmitted as a signal carrying the multiple modes or waves shapes in one radar (transmission) cycle. Further, the continuous-wave energy may be transmitted via one of the multiple sets of antenna associated with a FOV for the target and at least one or more auxiliary antennas (whether separate from or selected from among a different one of the multiple sets of the transmit antennas).

Consistent with the above aspects and in yet another example, another aspect involves the differences in antenna gain and in some instances also differences in phase associated with antenna positions, being assessed by the signal processing circuitry. Such assessment involves using Doppler division associated with the concurrent transmission of the continuous-wave energy, wherein the continuous-wave energy is concurrent in the one of multiple modes and via respective ones of the multiple sets of transmit antennas. Such example embodiments may be used to mitigate or completely resolve spatial ambiguities associated with an actual direction of arrival of the received reflections.

In certain more specific examples, multiple sets of transmit antennas may include a first set of antennas for shorter-range detection, a second set of antennas for a medium-range detection, and a third set of antennas for a longer-range detection. The first set, the second set and third set are respectively associated with a first wave-shape mode, a second wave-shape mode and a third wave-shape mode, and these sets are also used to mitigate or completely resolve spatial ambiguities associated with an actual direction of arrival of the received reflections.

According to yet other specific examples of the present disclosure, embodiments are directed to a method wherein for each of the multiple sets of transmit antennas, a different set of spacings between transmit antennas is used. Also, the different sets of spacings correspond to a transmit-spacing dimension which is not an integer multiple of a receive-spacing dimension. Such receive-spacing dimension defines the spacing between the multiple receive antennas. Also, the receive-spacing dimension is not an integer multiple of the transmit-spacing dimension. For example, the difference in spacing between the transmitters may be used to facilitate resolving the elevation measurement.

In other specific examples, the transceiver circuitry uses the multiple sets of transmit antennas as a multiple-input multiple-output (MIMO) radar through which multiple sets of chirps are used for each of the multiple modes. As one example in which interleaved chirps might be used, in each of multiple chirping cycles each of the multiple MIMO waveshapes are used to allow for performing angle-velocity object detection while facilitating mitigation or resolution of at least one of the spatial ambiguities discussed hereinabove.

According to other specific examples, aspects of the present disclosure are directed to or involve transmission of the same signal via multiple sets of transmit and associated receive antennas, each corresponding to a different (contiguous) field of view. The antennas may be used to create an array of virtual antennas associated with the plurality of different modes. Optionally, each such mode and associated field of view may be associated with a respective one of multiple ranges (also associated with the different field of view). The multiple transmit and multiple receive antennas can be used to create a virtual aperture (as conventional) which has a number of virtual antennas corresponding to the product of the number of transmit and receive antennas and, by assessing the reflected received radar signals depending on the aperture of the involved antennas in the virtual array (e.g., the number of virtual elements being a multiple of the spacing between the elements) the resolution in terms of direction of arrival (DOA) is significantly enhanced to separate the actual position of the radar-detected objects.

Other specific aspects, which may be used in some example embodiments according to the present disclosure, are directed to methods involving the received reflections which provide respective phase differences due to the different spatial positions of the sets of transmit antennas corresponding to the different modes. The signal processing circuitry may respond to the received reflections by assessing the phase differences as an additional provision in mitigation or resolution of one or more of the spatial ambiguities.

In another specific example, embodiments are directed to an apparatus involving transceiver circuitry, including multiple sets of transmit antennas and including multiple receive antennas. The receive antennas may receive reflections of continuous-wave energy. Also, multiple sets of transmit antennas may correspond respectively to a plurality of different modes. The apparatus may also use at least one transmit antenna from each of at least two of a plurality of the multiple sets to transmit the continuous-wave energy concurrently (simultaneously) in one or more of the plurality of different modes. The signal processing circuitry may respond to the received reflections of the continuous-wave energy so as to assess differences in antenna gain and antenna position associated with the received reflections and, in response, to mitigate or resolve at least one spatial ambiguity in at least one direction of arrival dimension associated with the received reflections.

Figure 3A:
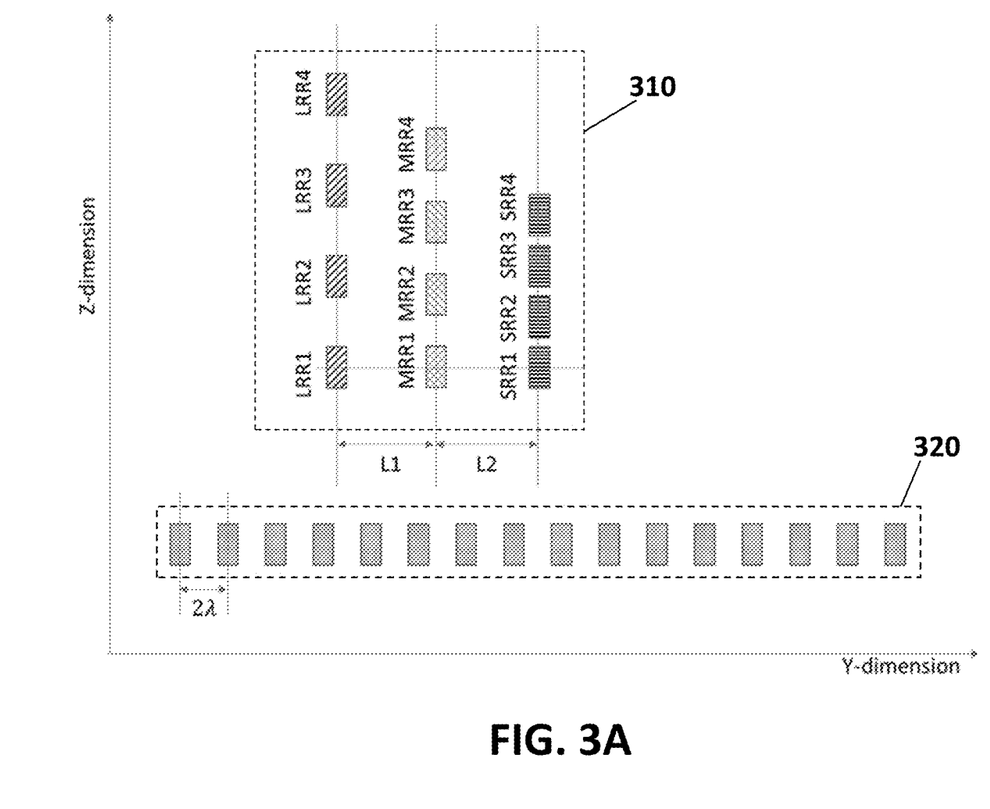
FIG. 3A is a two-dimensional plot illustrating an example of the positioning of multiple sets of transmitters and multiple receive antennas, in accordance with the present disclosure.
Figure 3B:
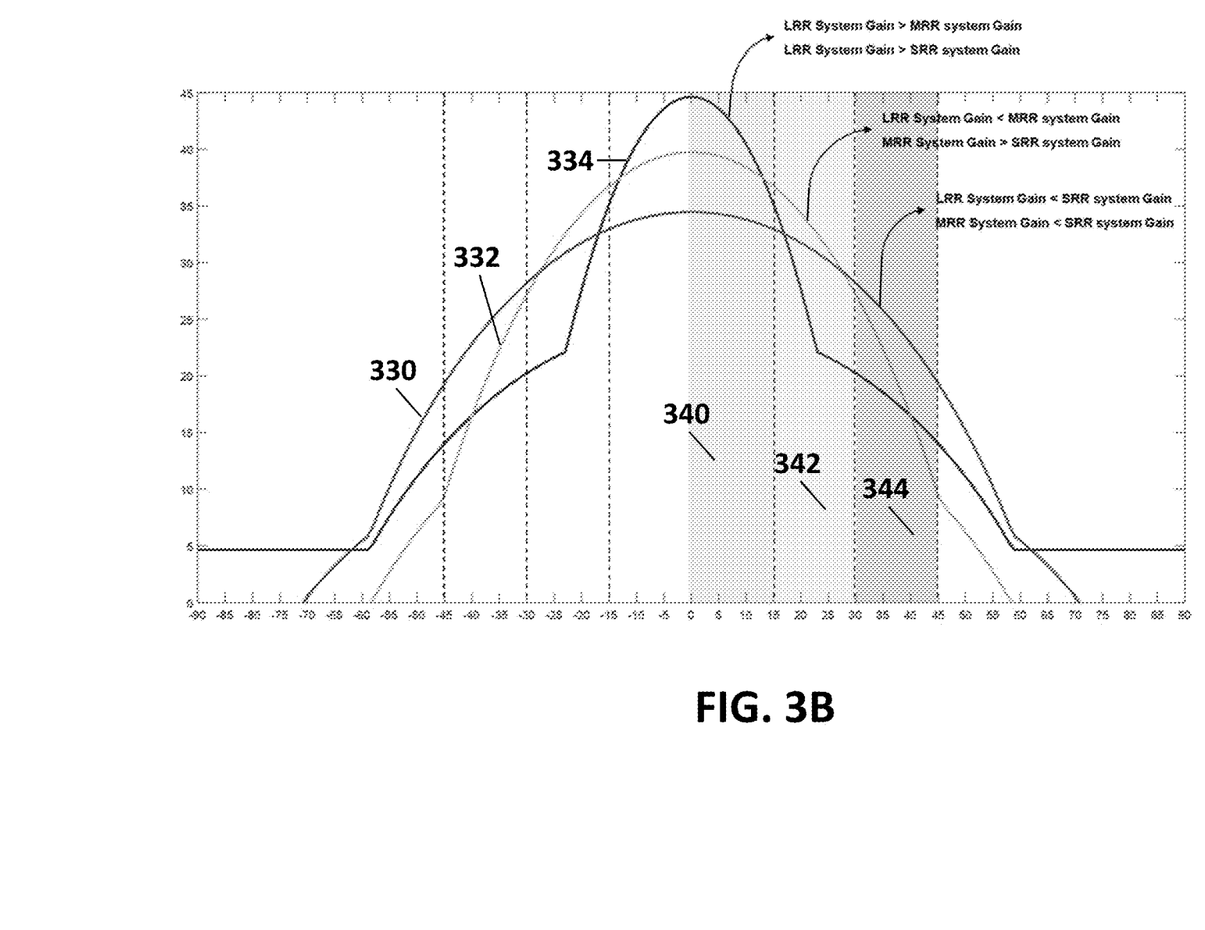
FIG. 3B is an illustration depicting an example of radar antenna patterns used for target discovery, in accordance with the present disclosure.
Figure 4:
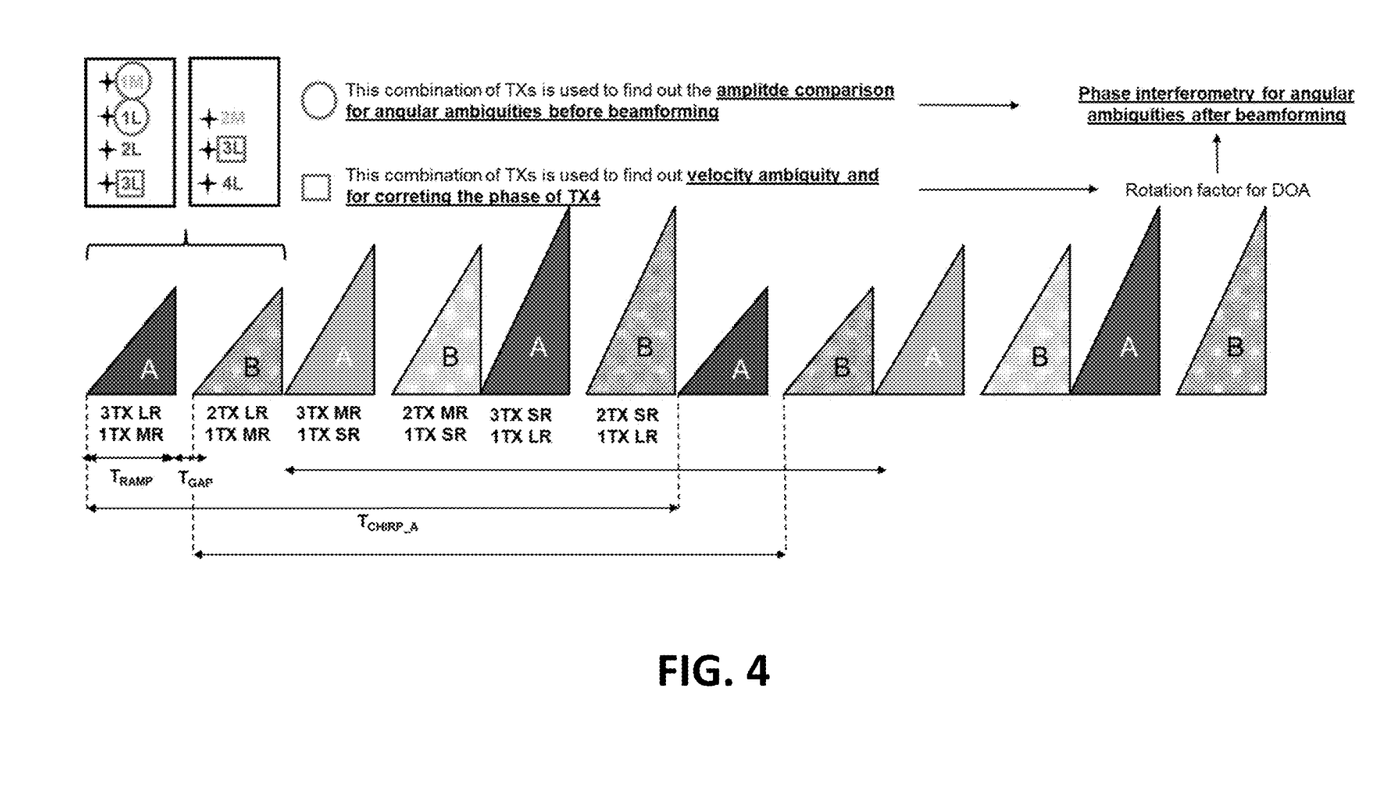
FIG. 4 is a graph illustrating an example in which chirp sequences are transmitted (and their reflections received) to perform range-velocity estimation of targets, in accordance with the present disclosure.

In connection with experimental examples relating to the previously-described aspects and example embodiments, FIGS. 3A, 3B and FIG. 4 are presented to illustrate configurations and performance plots of a transceiver operating according to such aspects and example embodiment of the present disclosure. FIG. 3A is a two-dimensional plot illustrating an example of the positioning of multiple sets of transmitters 310 and multiple receive antennas 320. In direction of arrival (DOA) radar signal processing according to aspects described herein, the antennas may be seen as spatial samples and the spacing between the antennas may be understood as the inverse of an angle of arrival sampling frequency. The maximum, unambiguous angle (in degrees) that can be detected is given by Equation 1 as follows:

$$\varphi_{max} = \frac{180}{\pi} \arcsine\left(\frac{\lambda}{2d}\right), \qquad 1.$$

where d and $\lambda$ represent the spacing between the antennas in meters and the wavelength, respectively. As may be recognized from the above Equation 1 and from Equation 2 below, it is possible to increase the DOA resolution at the expense of DOA ambiguity.

In this example of FIG. 3A, this increase the DOA resolution may be realized in a system including a total of twelve transmit antennas depicted in a grouping 310 and sixteen receive antennas in a grouping 320. The twelve transmit antennas are associated with three FOVs (as in FIG. 2) including: a set of four antennas spaced for long-range detection depicted as LRR1, LRR2, LRR3 and LRR4, a set of four antennas spaced closer together for medium-range detection depicted as MRR1, MRR2, MRR3 and MRR4, and a set of four antennas spaced for short-range detection depicted as SRR1, SRR2, SRR3 and SRR4. The spacing between the adjacent sets of vertically-oriented antennas is shown as L1 and as L2, with L2 being greater than L1. It will be appreciated, however, that in other examples, greater or fewer sets of antenna may be used. Also, greater and/or fewer antennas in each set may be used.

The illustrated receive antennas 320 of FIG. 3A are shown being located on a straight line along the Y axis with a spacing between the receive antennas equal to two times the operative wavelengths resulting in a maximum unambiguous DOA of +/−15 degrees (i.e., the array has a visible region or VR of +/−15 degrees). This means that if strong reflecting objects are located at a DOA exceeding 15 degrees they can alias into the VR and be misinterpreted leading to dangerous situations for the radar application. The position of the angular aliases may be calculated as below as shown in Equation 2:

$$\varphi_k = \frac{180}{\pi} \arcsin\left(\frac{\varphi_0 \lambda}{2\pi d} + k\frac{\lambda}{d}\right) \qquad 2.$$

Where $$\varphi_0 = 2\pi \frac{d}{\lambda} \sin(\varphi_{DOA}),$$

and where k is a positive integer.

Continuing with the example of FIG. 3A, the illustration of sixteen identical receive antennas 320 with a spacing of 2 wavelengths. This may lead to a DOA resolution of 1.6 degrees (without windowing), as shown in Equation 3 below:

$$\varphi_{res} = 180 \times 0.886 \frac{\lambda}{\pi \times N_{rx} \times d} = 180 \times 0.886 \frac{1}{\pi \times 16 \times 2} = 1.6 \ deg. \qquad 3.$$

In the example illustrated in FIG. 3A, each mode uses a fraction of the number of transmit antennas, and as above there are three sets of transmit antennas with four antennas each (310). In the illustrated elevation plane (z-dimension), the transmitting antennas of each mode are also placed at distances greater than half the wavelength and hence cause elevation-ambiguities in the Field of View (FoV). In some systems, the radiation patterns of the antennas may be focused in the elevation more than in azimuth (y-dimension) due to the interest on smaller elevation-FoV and the need to increase the system gain of the radar. To achieve the focusing in elevation, the antenna size may need to be much larger than one half-wavelength. As such, it may not be physically possible to place the antennas (in the array configuration 310 shown in FIG. 3A) at half-wavelength distance in the vertical axis, causing ambiguities to occur in the angular domain. Due to their physical size, the transmit antennas 310 may be placed at a vertical distance that causes ambiguities to still appear within the FoV. As in the case of the ambiguities in the azimuth, this has the advantage of increasing the resolution in the elevation since the total aperture in elevation is larger.

The azimuth ambiguity may be resolved by exploiting differences between transmit antenna sets. Specifically in this example, the difference in antenna gain between the transmit antennas 310 and the difference in antenna location (leading to phase differences) may be used. Starting with the use of antenna gain, a comparison between received signal powers (relative to the transmitted signal from the antennas of the respective sets being used) may be made to resolve ambiguities. In this regard, the power received when transmitting from one transmit antenna set via one mode is compared to the power received when transmitting with another of the transmit antenna sets in the same mode. Due to the large receive antenna spacing, the reflected signal appears to be located between +/−15 degrees. However, depending on the actual DOA of the reflector the received signal power may vary when different transmit antennas are used. For example, if the reflector is located at 20 degrees it is represented as a signal arriving from −9 degrees due to the aliasing. However, the received signal power should be the strongest when the MRR transmit antenna is used.

Turning now to FIG. 3B, object antenna patterns are illustrated from three different transmitting antennas, SRR 330, MRR 332, LRR 334. The three regions 340, 342, and 344 from FIG. 3B are chosen such that they cover angular ambiguity region matching the 2-wavelength receiver antenna spacing. Then the actual DOA can be determined or retrieved as $$\varphi_k = \frac{180}{\pi} \arcsin\left(\frac{\varphi_0 \lambda}{2\pi d} + 1\frac{\lambda}{d}\right) = 20 \text{ degrees} \qquad 3.$$

wherein d=2λ.

In such examples, the antenna gain is dependent on an exact antenna design and in practice such a design may be hard to realize under all circumstances. Therefore, a secondary ambiguity-resolving mechanism may be used as an optional supplemental/complementary approach. This mechanism works with the phase of the received signal. For example, the phase of the received signal differs when the signal has been transmitted with MRR1 rather than with LRR1. As LRR1 and MRR1 are located at equal Z coordinates this phase difference is due to the difference in antenna position. Then, a DOA estimate based upon this phase difference can be formulated which is highly ambiguous. The ambiguous DOA are located as in Equation 4 below:

$$\varphi_k = \frac{180}{\pi} \arcsin\left(\frac{\varphi_k \lambda}{2\pi L1} + k\frac{\lambda}{L1}\right) \qquad 4.$$

where k in a positive integer.

The distance L1 is chosen in such a way that is it not an integer multiple of the receiver antennas spacing or vice versa. To utilize this additional DOA estimate two received signals may be used, for example: one received signal originating from LRR1, and one originating from MRR1. The phase difference may then be obtained by multiplying the relevant signal sample of LRR1 with the complex conjugate of the relevant signal sample from MRR1 to yield $\varphi_k$. Now an additional ambiguous DOA estimate is available. By estimating all possible DOA estimates from the receiver array, the amplitude comparison and the phase comparison the true DOA may be found. This true DOA may be found as the DOA hypothesis which may be shared by all three estimates.

Also consistent with the present disclosure, consider as one of many other exemplary distributions of transmit antennas and associated configurations of different transmit chirps, the following two configurations are also associated with three FOVs respectively for long range, medium range and short range radar. In one configuration: for the long range FOV, two long-range antennas and two medium-range antennas are used; for the medium range FOV, two medium-range antennas and two short-range antennas are used; and for the short range FOV, two short-range antennas and two long-range antennas are used. In the second configuration: for the long range FOV, three long-range antennas and zero medium-range antennas are used; for the medium range FOV, three medium-range antennas and zero short-range antennas are used; and for the short range FOV, three short-range antennas and zero long-range antennas are used. The processing methodology as discussed above in connection with FIG. 3A may also be applied for these distributions of transmit antennas and associated configurations. With different spatial positions of the sets of transmit antennas, the phase difference in the reflected signals (due to the different spatial position of the sets of transmit antennas) are used by the processing circuitry in each such transceiver to help resolve the noted ambiguities.

FIG. 4 shows further details in connection with another specific example of waveform design and on how the resources in term of transmitters and receivers may be used along the digital processing chain to solve ambiguities. The waveform is designed to have each mode self-unambiguous which means to have an unambiguous information about the scenario in which the objects are targeted (range and velocity and, in some instances also DOA). Two sets of interleaved chirps per mode may be used, in this example, to perform angle-velocity unambiguous target detection within one system cycle. Assumed for this example are: a known MIMO scheme (Doppler division multiple access or DDMA) where each transmitter emits an identical frequency ramp at a small, unique, frequency offset; and also a known technique to resolve velocity ambiguity using a (time-interleaved) chirp sequence. In this example and as previously with FIGS. 3A and 3B, the transceiver or (transceiver radio system) may include twelve transmit antennas and sixteen receive antennas (for three such different FOVs referred to via annotations LRR, MRR and SRR, and it is understood that greater or fewer antennas and greater or fewer FOVs may be used). With reference to the LRR mode in this example, a chirp sequence of $N_{chirp}$ (or of N chirps with N again referring to a positive integer) is used to perform range-velocity estimation of targets. A number of modes $N_{Mode}$ and a number of profiles $N_{Profile}$ are used. As there are two sets of interleaved chirps per mode in this example, the $N_{Profile}=2N_{Mode}$, wherein the $N_{Mode}$ is the number of modes (waveshapes or configurations) to be associated with the Doppler sampling. Between the odd and even chirp, an additional offset time $T_{GAP}$ is placed, therefore the repetition time is $T_{Chirp}=N_{Modes}T_{GAP}+N_{profile}T_{Ramp}$, the total measurement time is $T_{Meas}=N_{chirp}T_{Chirp}$, and the velocity resolution corresponds to $$\Delta V_{res} = \frac{3.6\lambda}{2(T_{Meas})},$$

where $\lambda$ is the wavelength associated with the system carrier frequency, where Tchirp is the chirp-caused time offset. It is appreciated that the chirps are staggered due to the time offset which is associated with or causes a phase difference between detected peaks of the respective Doppler-spectrum data sets (where N is an associated positive integer in each instance). All the odd and even chirps are used to create two separate sequences (processing flows) which leads to two separate range velocity estimations of the same scenario. The number of processed chirps per sequence may be $0.5N_{chirp}$.

Consistent with the preceding example, two Range-Doppler images may be created for two chirp sequences by using a two-dimensional fast Fourier transform (2D-FFT) via another set of example Configurations A and B (chirp-sequence A and chirp-sequence B) as indicated in FIG. 4. Under each triangularly-shaped ramp, there is annotation to indicate which antennas of the sets (long, medium and short) are used for each given chirp-sequence. Targets may appear in the same range-velocity bins for both processed chirp sequences since the measurement time $T_{Meas}$ remains the same. In this example, and for the LRR (long range radar) mode Configuration A (as under the far-left first triangularly-shaped ramp), antenna LRR1-LRR2-LRR3 are used with the LLR configuration and antenna MRR1 (same Z coordinates as LRR1) is used again with the LLR configuration. The spacing between LRR1 and MRR1 in the azimuth direction is L1. The LRR mode associated with Configuration B uses the LRR3-LRR4 antennas and the MRR2 antenna (as under the next triangularly-shaped ramp), both again with the long range radar configuration. Still viewing the horizontal graph of FIG. 4 from left to right, the next four triangularly-shaped ramps respectively correspond to the pair of the chirp sequence sets A and B transmitted for the MRR (medium range radar) configuration and then a pair of the chirp sequence sets A and B for the SRR (short range radar) configuration: for the MRR configuration with Configuration A using antennas MRR1-MRR2-MRR3 and antenna SRR1 (same Z coordinates as MRR1), and with Configuration B using MRR3-MRR4 antennas and antenna SRR2 (same Z coordinates as MRR1); and for the SRR configuration, with Configuration A using antennas SRR1-SRR2-SRR3 and antenna LRR1 (same Z coordinates as SRR1), and with Configuration B using antennas SRR3-SRR4 and antenna LRR2 (same Z coordinates as MRR1). These transmissions are then repeated as reflected in FIG. 4.

Based on this example of FIG. 4, ambiguities may be resolved as depicted for example above the first two illustrated triangularly-shaped ramps respectively corresponding to the pair of the chirp sequence sets A and B transmitted as discussed above. For the LRR configuration, for example, the reflections associated with the following of combinations of antennas are used: associated with Configuration A antennas LRR1 and MRR1 to find the amplitude comparison (as depicted by the encircled "1M" and encircled "1L"), and associated with Configuration B the antennas LRR1 and MRR1 is used to find the velocity ambiguity and to correlate the phase of antenna LRR4 (as depicted by each of the two occurrences of "3L" in a square). The above amplitude comparison is used as one input to phase-interferometry logic for angular ambiguities after beam forming, with another input corresponding to the above velocity ambiguity (after applying a rotation factor to account for the rotation of the reflected signal in connection with the direction of arrival). Thus, each of these three aspects are used to resolve the ambiguity or ambiguities. Such logic may be, for example, in logic circuitry such as implemented in software programming instructions by the transceiver's processing circuitry.

Using, for example, QPSK modulation a DDMA MIMO scheme can be achieved where all transmitters may be simultaneously active and can be separated later on in the decoding signal processing chain. However, selection of QPSK or a different type of modulation format depends on how design requirements such as how many transmitters and/or transmit antennas are in use. Accordingly in this example and as previously discussed for other examples, antennas from each of two transmit antenna sets are used for such multi-mode transmission and for resolving spatial ambiguities.

Figure 5:
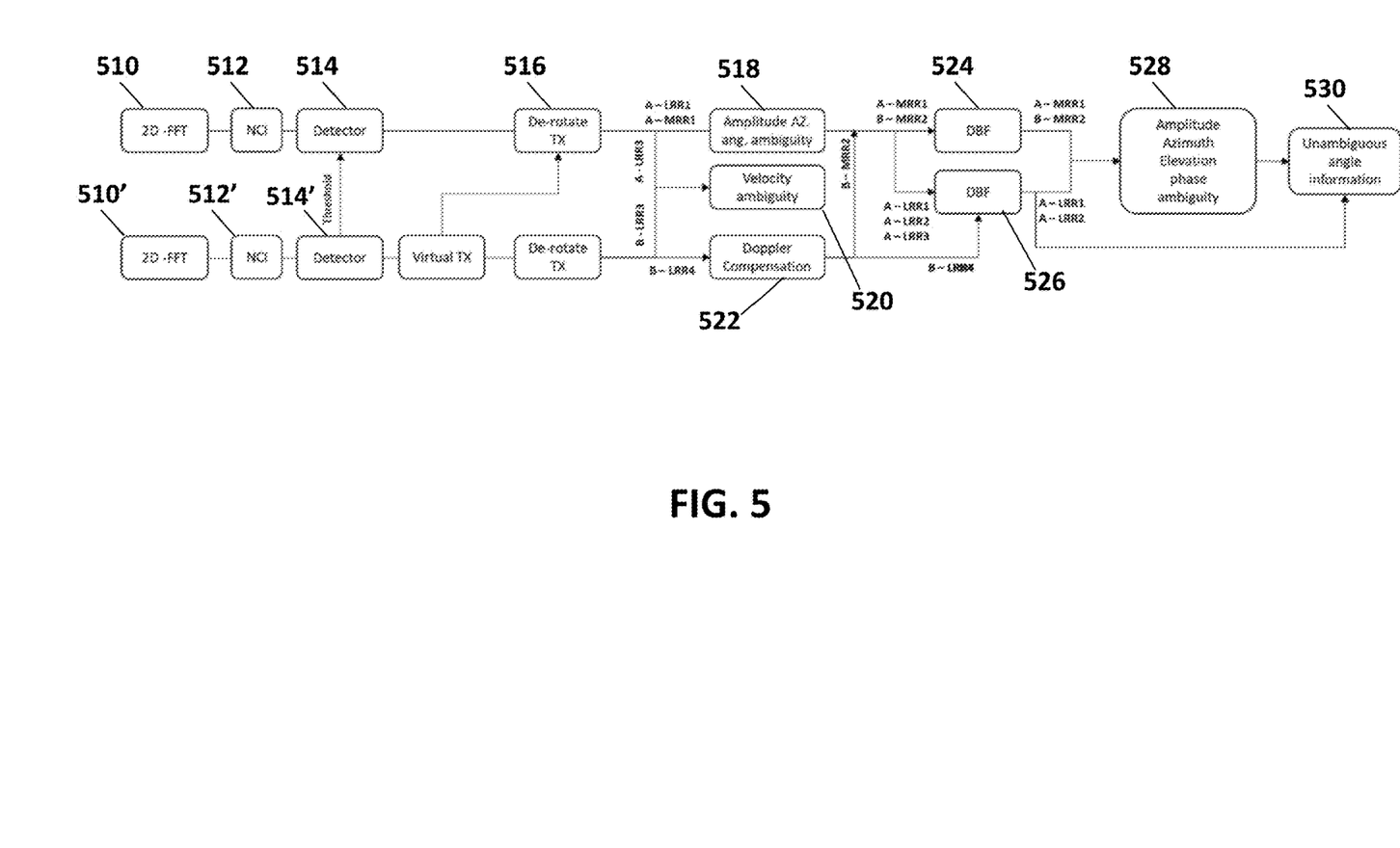
FIG. 5 is a process flow diagram illustrating an example of signal processing for ambiguity resolving, in accordance with the present disclosure.

One example way for processing such radar transmissions is shown in the flowchart of FIG. 5. As noted above, two Range-Doppler images may be created for the two chirp sequences using a 2D-FFT in and along two parallel processing paths beginning with processing stages (depicted by parallel blocks 510, 512, 514, 516). After the 2D-FFT processing 510 for initial assessment of range and velocity, a non-coherent integration (NCI) 512 of the B channel is performed and this may be followed by performing peak detection at 514 using a conventional ordered-statistics approach (e.g., CFAR or OS-CFAR). Where DDMA methodology is employed, the $N_{tx}$ transmitters are packed in the spectrum reducing the maximum, unambiguous velocity by a factor $N_{tx}$ (where N is a positive integer, typically but not necessarily two or more). In the situation where the target velocity exceeds the maximum unambiguous velocity for a given chirp configuration, a transmitter placed at the extreme end of the Doppler spectrum causes a cyclically shift into the transmitter spectrum at the other extreme end of the Doppler spectrum. Therefore, the position of the virtual transmitter is individuated to properly de-rotate 516 for sequence B. Sequence A may be de-rotated as well to start comparing amplitude and phase for velocity angular ambiguities (block 518). Since the chirp sequence B only uses 3 transmitters, the position of the empty Doppler spectrum indicates the cyclic shift. After sequences A and B have been de-rotated, a phase comparison 520 for the LRR3 can be done to unambiguously resolve the target velocity. As at block 522, the resultant unambiguous velocity can be than also used to compensate the Doppler effect of the LRR4 and MRR2 due to a shift in the time domain of its transmitted signal.

Also, the peak power difference associated with the LRR1 and MRR1 antennas may be used to obtain a first impression on the possible ambiguity factor of the targets (as shown in FIG. 3B), and digital beamforming (DBF) at 524 and 526 of FIG. 5 can be applied. As shown in the top portion 524 of the DBF, the angular processing associated with the MRR1 and MRR2 antennas (using the sixteen receiver elements) may be performed, while in the bottom portion 526 the angular processing associated with the four LRR transmitters (and also using the sixteen receivers) may be performed. From the DBF stages as at 524 and 526, the overall angular processing 530 for the whole LRR as well as the azimuth/elevation phase ambiguities (from block 528) are resolved using such methodology as previously described.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 510 and 512 of FIG. 5 depict a block/module as described herein). Such circuits or circuitry are used together with other elements to exemplify how certain embodiments may be carried out in the form or structures, steps, functions, operations, activities, etc. As another For example, in certain of the above-discussed embodiments, one or more modules are discrete logic circuits or programmable logic circuits configured and arranged for implementing these operations/activities, as may be carried out in the approaches discussed above. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with various ones of the above-described examples, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning but rather to provide grammatical antecedent for referring to each such structure separately.

Based upon the above discussion and illustrations, those skilled in the art would recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method comprising:
via multiple sets of transmit antennas associated with different fields of view included with transceiver circuitry and respectively corresponding to a plurality of different wave shape modes, using at least one transmit antenna from at least two of a plurality of the multiple sets to transmit continuous-wave energy concurrently in one or more of the plurality of different wave shape modes, wherein the continuous-wave energy transmitted by the transmit antenna of the different sets of transmit antennas includes a same wave shape mode;
via multiple receive antennas included with the transceiver circuitry, receiving reflections of the continuous-wave energy from the multiple sets of transmit antennas; and
signal processing circuitry responding to the received reflections of the continuous-wave energy by assessing differences in antenna gain and phase among respective reflections of the continuous-wave energy associated with the same wave shape mode transmitted by the transmit antenna of the different sets of transmit antennas, the differences due to transmit antenna position associated with the received reflections to mitigate or resolve at least one spatial ambiguity in at least one direction of arrival dimension associated with the received reflections.

2. The method of claim 1, wherein the signal processing circuitry responds to the received reflections by using each of a plurality of the multiple receive antennas to assess the differences in antenna gain and phase due to transmit antenna position, and wherein using at least one transmit antenna from each of at least a plurality of the multiple sets includes using at least one transmit antenna from each respective one of the plurality of the multiple sets.

3. The method of claim 1, wherein the multiple sets of transmit antennas include a first set of antennas for one wider field of view which is wider than at least one other of the fields of view, and wherein the signal processing circuitry into mitigate or resolve said at least one spatial ambiguity relative to each of the fields of view.

4. The method of claim 1, wherein the antennas in a first set of the multiple sets are arranged with spacings between the antennas to facilitate resolving said at least one spatial ambiguity.

5. The method of claim 1, wherein for each of the multiple sets of transmit antennas, a different set of spacings between transmit antennas is used, and wherein the different sets of spacings correspond to a transmit-spacing dimension which is not an integer multiple of a receive-spacing dimension defining spacing between the multiple receive antennas and wherein the receive-spacing dimension is not an integer multiple of the transmit-spacing dimension.

6. The method of claim 1, wherein a first field of view (FoV) associated with one of the plurality of different wave shape modes has a wider field of view of associated with another of the plurality of different wave shape modes, wherein the signal processing circuitry uses each of the first and wider FoVs to mitigate or resolve at least one spatial ambiguity in both azimuth and elevation planes.

7. The method of claim 1, wherein the multiple sets of transmit antennas included with transceiver circuitry is associated respectively with the plurality of different wave shape modes and with the plurality of different fields of view, each of the fields of view having an associated range.

8. The method of claim 1, further including:
using at least one transmit antenna from each of the multiple sets to transmit continuous-wave energy in one of the plurality of different wave shape modes in each radar cycle;
transmitting via each of a plurality of the transmit antennas of one of the multiple sets for transmission associated with a corresponding one of the plurality of different wave shape modes; and
transmitting via at least one auxiliary antenna, wherein said at least one auxiliary antenna is at least one transmit antenna that is different than one of the multiple sets of the transmit antennas.

9. The method of claim 1, further including assessing information concerning said at least one spatial ambiguity to retrieve an actual direction of arrival of the received reflections.

10. The method of claim 1, wherein the differences in antenna gain and transmit antenna position are assessed by the signal processing circuitry using Doppler division associated with the concurrent transmission of the continuous-wave energy concurrently in one of the plurality of different wave shape modes via respective ones of the multiple sets of transmit antennas.

11. The method of claim 1, wherein the multiple sets of transmit antennas include a first set of antennas for shorter-range detection, a second set of antennas for a medium-range detection, and a third set of antennas for a longer-range detection, and wherein the first set, the second set and third set are respectively associated with a first wave-shape mode, a second wave-shape mode and a third wave-shape mode.

12. The method of claim 1, wherein the transceiver circuitry uses the multiple sets of transmit antennas as a multiple-input multiple-output (MIMO) radar through which multiple sets of interleaved chirps are used for each of the different wave shape modes.

13. The method of claim 1, wherein the transceiver circuitry uses multiple-input multiple-output (MIMO) radar detection with multiple sets of interleaved chirps being used, in each of multiple chirping cycles, for each of the different wave shape modes to perform angle-velocity object detection while to facilitate the mitigation or resolution of said at least one spatial ambiguity.

14. The method of claim 1, wherein the multiple sets of transmit antennas and the multiple receive antennas are used to create an array of virtual antennas associated with the plurality of different wave shape modes which in turn, are associated with different fields of view and ranges relating to the different fields of view.

15. The method of claim 1, wherein signal processing circuitry further responds to the received reflections of the continuous-wave energy by assessing one or more phase differences, corresponding to the transmit antenna gain and antenna position, to mitigate or resolve said at least one spatial ambiguity in at least one direction of arrival dimension associated with the received reflections.

16. The method of claim 1, wherein the multiple sets of transmit antennas include a shortest range set, a longest range set, and another set associated with a range between shortest and longest ranges respectively associated with the shortest range set and the longest range set, and further including using the other set in combination with the longest range set to resolve an angular ambiguity involving detection of a target in the longest range.

17. The method of claim 16, wherein using the other set in combination with the longest range set includes using M antennas from the other set and L antennas from the longest range set, wherein each of M and L are integers and M is greater than L.

18. The method of claim 1, wherein the multiple sets of transmit antennas include a shortest range set, a longest range set, and another set associated with a range between shortest and longest ranges respectively associated with the shortest range set and the longest range set, and further including using the other set in combination with the shortest range set to resolve an angular ambiguity involving detection of a target in the shortest range.

19. The method of claim 16, wherein using the other set in combination with the longest range set includes using M antennas from the other set and S antennas from the shortest range set, wherein each of M and S are integers and M is greater than S.

20. An apparatus comprising:
transceiver circuitry, including multiple sets of transmit antennas associated with different fields of view and including multiple receive antennas to receive reflections of continuous-wave energy to use the multiple sets of transmit antennas as corresponding respectively to a plurality of different wave shape modes, and to use at least one transmit antenna from at least two of a plurality of the multiple sets to transmit concurrently the continuous-wave energy in one or more of the plurality of different wave shape modes, wherein the continuous-wave energy transmitted by the transmit antenna of the different sets of transmit antennas includes a same wave shape mode; and
signal processing circuitry to respond to the received reflections of the continuous-wave energy from the multiple sets of transmit antennas, to assess differences in antenna gain and phase among respective reflections of the continuous-wave energy associated with the same wave shape mode transmitted by the transmit antenna of the different sets of transmit antennas, the differences due to antenna position associated with the received reflections and, in response, to mitigate or resolve at least one spatial ambiguity in at least one direction of arrival dimension associated with the received reflections.

* * * * *